(12) United States Patent
Daoud et al.

(10) Patent No.: US 7,984,147 B2
(45) Date of Patent: Jul. 19, 2011

(54) APPARATUS AND METHOD FOR IDENTIFYING A REQUESTED LEVEL OF SERVICE FOR A TRANSACTION

(75) Inventors: Raja Daoud, Santa Clara, CA (US); Francisco J. Romero, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2991 days.

(21) Appl. No.: 09/751,009

(22) Filed: Dec. 29, 2000

(65) Prior Publication Data

US 2002/0087694 A1 Jul. 4, 2002

(51) Int. Cl.
*G06F 15/173* (2006.01)
(52) U.S. Cl. .......................... 709/226; 709/240
(58) Field of Classification Search .............. 709/224, 709/225, 226, 228, 229, 240
See application file for complete search history.

(56) References Cited

U.S. PATENT DOCUMENTS

| | | | | |
|---|---|---|---|---|
| 6,006,264 A * | 12/1999 | Colby et al. | ................... | 709/226 |
| 6,366,581 B1 * | 4/2002 | Jepsen | ........................... | 370/397 |
| 6,377,548 B1 * | 4/2002 | Chuah | ............................ | 370/233 |
| 6,389,448 B1 * | 5/2002 | Primak et al. | ................... | 718/105 |
| 6,446,722 B2 * | 9/2002 | Nguyen et al. | ................ | 166/278 |
| 6,449,647 B1 * | 9/2002 | Colby et al. | ................... | 709/226 |
| 6,452,915 B1 * | 9/2002 | Jorgensen | ...................... | 370/338 |
| 6,483,805 B1 * | 11/2002 | Davies et al. | ................ | 370/235 |
| 6,487,170 B1 * | 11/2002 | Chen et al. | .................... | 370/231 |
| 6,578,068 B1 * | 6/2003 | Bowman-Amuah | .......... | 709/203 |
| 6,584,444 B1 * | 6/2003 | Tello et al. | ........................ | 705/1 |
| 6,654,363 B1 * | 11/2003 | Li et al. | .......................... | 370/338 |
| 6,779,017 B1 * | 8/2004 | Lamberton et al. | ........... | 709/203 |
| 6,871,233 B1 * | 3/2005 | Bearden et al. | ................ | 709/226 |
| 6,985,436 B1 * | 1/2006 | Bhaskar | ......................... | 370/229 |
| 2001/0011306 A1 * | 8/2001 | Griesemer et al. | ............ | 709/315 |
| 2003/0039210 A1 * | 2/2003 | Jin et al. | ........................ | 370/229 |

FOREIGN PATENT DOCUMENTS

| | | |
|---|---|---|
| EP | 1113629 | 7/2001 |
| EP | 1179927 | 2/2002 |
| EP | 1199851 | 4/2002 |
| EP | 1209864 | 5/2002 |
| EP | 1154663 | 11/2002 |
| WO | WO 98/28938 | 7/1998 |
| WO | WO 00/30307 | 5/2000 |
| WO | WO 00/56023 | 9/2000 |
| WO | WO 01/40903 | * 6/2001 |
| WO | WO 01/86913 | 11/2001 |

\* cited by examiner

*Primary Examiner* — Ario Etienne
*Assistant Examiner* — El Hadji Sall

(57) ABSTRACT

An apparatus for identifying a requested level of service for a transaction wherein the transaction may be processed in accordance with the requested level of service. The invention is preferably embodied in computer readable program code stored in suitable storage media, and comprises, program code for selecting the requested level of service for the transaction, and program code for assigning the requested level of service to the transaction. The transaction is preferably a packetized signal comprising at least a data packet having a service tag associated therewith, wherein the service tag includes the requested level of service. The requested level of service can be any suitable factors or combination thereof, and can be assigned at any point on the network. The service tag is read from the transaction using suitable program code (e.g., at a load balancer), and based on the requested level of service, the transaction is directed to and processed by a network device that is best able to provide the requested level of service.

8 Claims, 7 Drawing Sheets

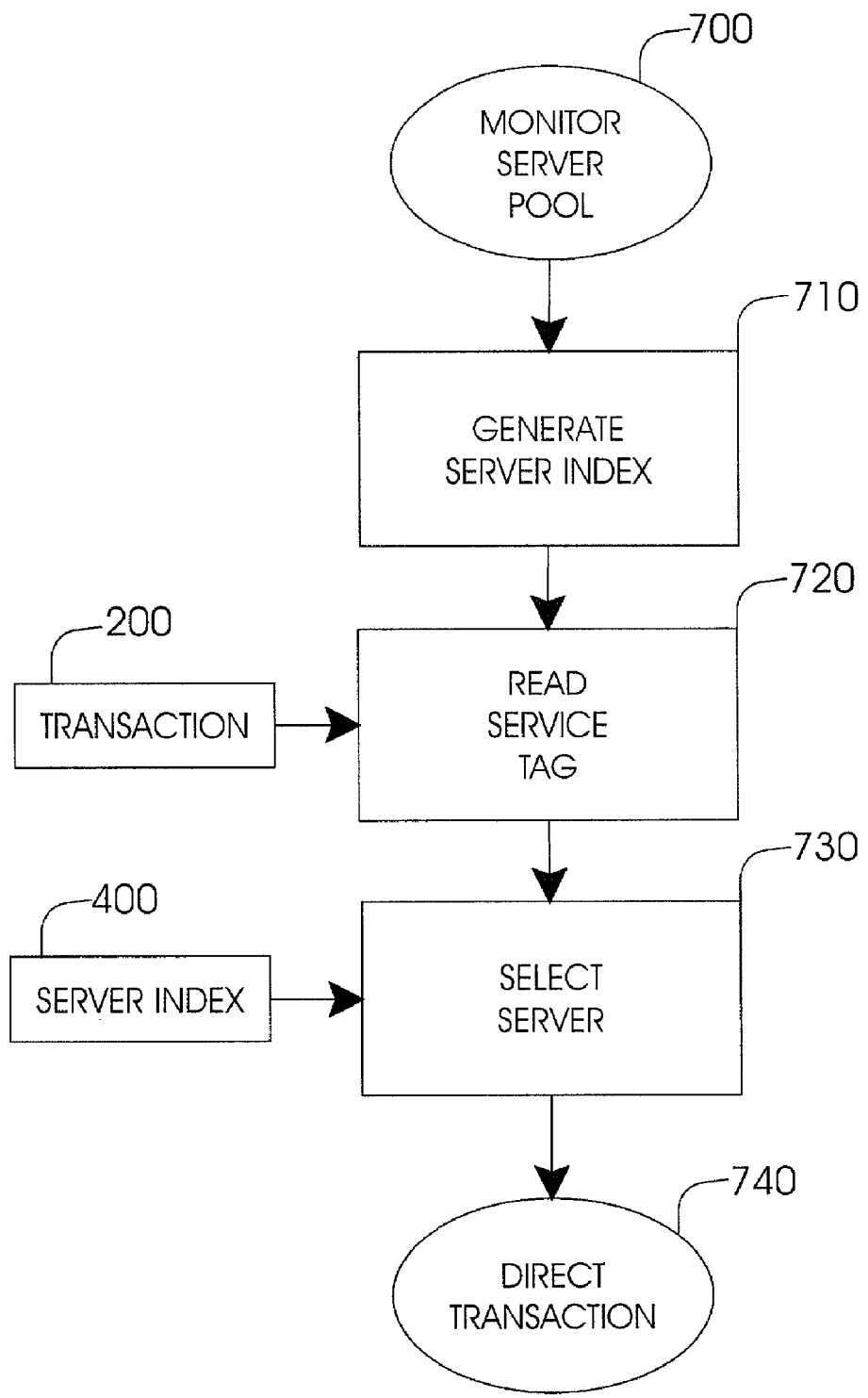

APPARATUS AND METHOD FOR IDENTIFYING A REQUESTED LEVEL OF SERVICE FOR A TRANSACTION

RELATED APPLICATION

This patent application is related to co-owned patent application for APPARATUS AND METHOD FOR ROUTING A TRANSACTION BASED ON A REQUESTED LEVEL OF SERVICE, having the same filing date and identified by Hewlett Packard Ser. No. 09/751,011.

FIELD OF THE INVENTION

The invention pertains to identifying a requested level of service for a transaction, wherein the transaction may be processed in accordance with the requested level of service.

BACKGROUND OF THE INVENTION

Server pools having multiple servers are often provided on networks, including the Internet, to handle large volumes of transactions (i.e., "requests to process data") thereon. Load balancing tools are used to direct incoming transactions to the server in the server pool in such a way that the traffic is balanced across all the servers in the pool. As such, the transactions can be processed faster and more efficiently.

One approach to load balancing simply involves routing each new transaction to a next server in the server pool (i.e., the "round-robin" approach). However, this approach does not distinguish between available servers and those which are down or otherwise unavailable. Therefore, transactions directed to unavailable servers are not processed in a timely manner, if at all. Other approaches to load balancing involve routing transactions to the next available server. That is, an agent monitors a pool of servers for failure and tags servers that are unavailable so that the load balancer does not route transactions to an unavailable server. However, this approach is also inefficient, still not necessarily routing transactions to the server that is best able to process the transaction. For example, a large transaction (e.g., a video clip) may be directed to a slow server even though there is a faster server available, because the slow server is identified as being the "next available" server when the transaction arrives at the load balancer. Likewise, a low priority transaction (e.g., an email) may be directed to the fast server simply based on the order that the servers become or are considered available.

A more current approach uses a combination of system-level metrics to route transactions and thus more efficiently balance the incoming load. The most common metrics are based on network proximity. For example, the 3/DNS load balancing product (available from F5 Networks, Inc., Seattle, Wash.) probes the servers and measures the packet rate, Web-request completion rate, round-trip time and network topology information. Also for example, the Resonate Global Dispatch load balancing product (available from Resonate, Inc., Sunnyvale, Calif.) uses latency measurements for load balancing decisions.

However, while system metric approaches measure server characteristics, the transaction is not routed based on service levels required by or otherwise specific to the transaction. That is, the transaction is not routed based on the transaction size, the originating application, the priority of the transaction, the identification of the user generating the transaction, etc. Instead, the transaction is routed to the fastest available server when the transaction arrives at the load balancer. As such, the video clip and the low priority email, in the example given above, still may not be efficiently routed to the servers for processing. For example, if the low priority email arrives at the load balancer when the fastest server is available, the email will be routed to the fastest server, thus leaving only slower servers available when the high priority video clip later arrives at the load balancer.

Likewise, transactions are often directed to other network devices (e.g., routers, servers, storage devices, etc.) based merely on an IP address. Again, such an approach may not be the most efficient when routing transactions from different applications, users, at different times, etc.

SUMMARY OF THE INVENTION

The inventors have devised a method and apparatus for identifying a requested level of service for a transaction wherein the transaction may be processed in accordance with the requested level of service.

The invention is preferably embodied in computer readable program code stored in suitable storage media, and comprises program code for selecting the requested level of service for the transaction, and program code for assigning the requested level of service to the transaction. Preferably, the transaction is a packetized signal having at least a data packet (e.g., the data to be processed), and a service tag including the requested level of service.

The requested level of service can be based on any suitable factors, and can be assigned at any point on the network. For example, the service tag can indicate the requested level of service as a predefined service category (e.g., premium, standard, low), a user identification (e.g., user1, user2, administrator), a transaction type (e.g., email, video), etc. Also for example, the service tag can be user-defined, set by the application submitting the transaction, set by an administrator, based on the time (e.g., weekday or weekend), based on the type of transaction, etc. Or for example, the requested level of service may be user-defined (e.g., using commands or strings of commands) via a suitable user interface. Or the requested level of service may be based on a combination of factors. For example, a transaction may include a requested level of service and a backup level of service, wherein the transaction is directed to the network device based on the backup level of service when the requested level of service is unavailable.

The service tag is read from the transaction using suitable program code (e.g., at a load balancer). Based on the requested level of service, the transaction is directed to a network device (e.g., a server) that is best able to provide the requested level of service for processing the transaction. For example, where the requested level of service associated with the transaction is a scale value of "50", the load balancer selects the server providing a corresponding service level nearest the requested level of service, such as a scale value of "48". Alternatively, the transaction can be processed by a server within a group of servers wherein each server best provides the requested level of service. For example, a category of service can be requested, such as "premium", and the load balancer thus selects any server from the group of servers providing a corresponding service level of "premium".

As such, the transaction is efficiently routed to a server based on service level information specific to the transaction. Thus for example, a low priority transaction (e.g., an email) may arrive at the load balancer before a high priority transaction (e.g., a video clip) when the fastest server is available. However, the low priority transaction is identified as such and routed to a slower server. Thus, the fastest server is available when the high priority transaction arrives at the load balancer, even so it arrives later than the low priority transaction.

These and other important advantages and objectives of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which:

FIG. 7 is a flow chart showing a method for routing the transaction of FIG. 2 to a server, as in FIG. 3 and FIG. 5;

DESCRIPTION OF THE PREFERRED EMBODIMENT

Figure 1:
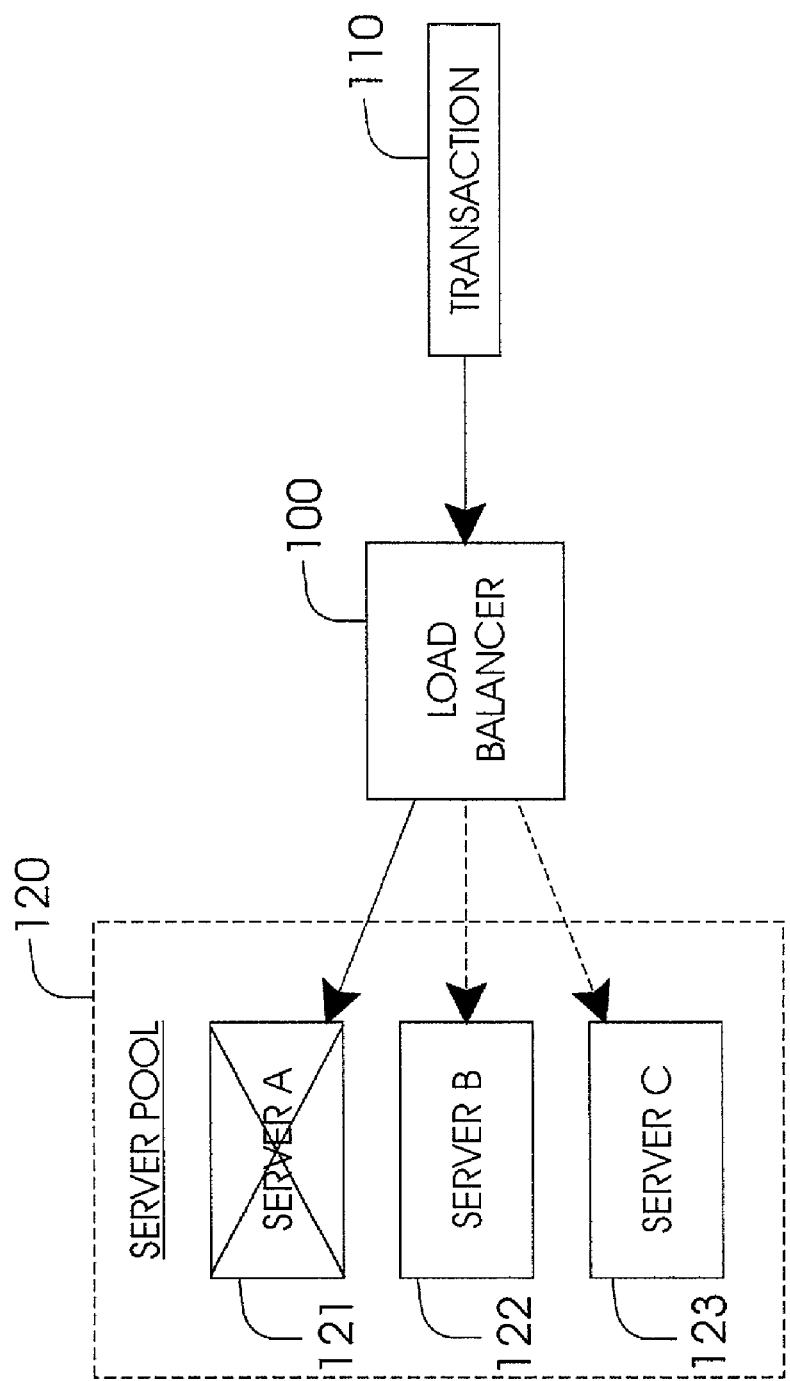
FIG. 1 shows a first embodiment of a load balancer for routing a transaction to a server.

FIG. 1 shows a load balancer 100 for routing a transaction 110 to a number of (i.e., one or more) servers 121, 122, 123 in a server pool 120. For purposes of illustration, Server A is unavailable as indicated by the "X" in FIG. 1. Using a simple "round-robin" approach, the load balancer 100 receives a next transaction 110 and directs the transaction 110 to the next server in the server pool 120 (i.e., the last server to have received a transaction). For example, where the previous transaction is directed to server 123 (Server C), the next server is server 121 (Server A) even where the server 121 (Server A) is unavailable as shown in FIG. 1, and so forth. Alternatively, the load balancer 100 directs the transaction 110 to the next available server in the server pool 120. That is, an agent (e.g., suitable program code) monitors each of the servers 121, 122, 123 in the server pool 120 and labels a server that has failed, shut down, or is otherwise unavailable, as "unavailable" (e.g., using a suitable computer readable tag). Thus, the load balancer 100 recognizes a server that has been labeled "unavailable" and does not route transactions to the unavailable server. For example, where the previous transaction was directed to server 123 (Server C) and server 121 (Server A) is indicated as being "unavailable", the next server is server 121 (Server A). However, the next available server is server 122 (Server B). Therefore, in this example the transaction 110 is directed to server 122 (Server B). Alternatively, the load balancer 100 can direct the transaction 110 to the "fastest" available server in the server pool 120. For example, where server 121 (Server A) generally provides a fast turn-around but is labeled "unavailable", server 122 (Server B) provides a medium turn-around, and server 123 (Server C) provides a slow turn-around, the transaction 110 is routed to server 122 (Server B). That is, although server 121 (Server A) is generally the fastest server in the server pool 120, server 121 (Server A) is unavailable, therefore leaving server 122 (Server B) as the fastest available server. However, none of these approaches direct the transaction 110 to a server 121, 122, 123 based on parameters specific to the transaction 110.

Figure 2:
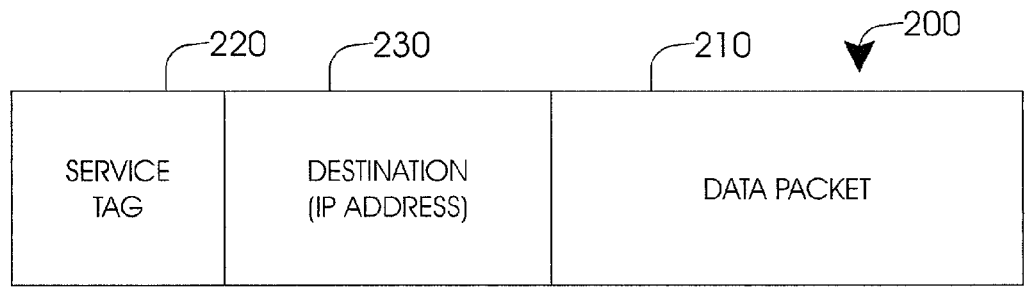
FIG. 2 shows a packetized transaction having a service tag associated therewith for requesting a level of service for the transaction.

FIG. 2 shows a packetized transaction 200. The packetized transaction 200 includes a data packet 210 (i.e., the data to be processed) and a service tag 220. The data packet 210 can include any data that is to be processed in any number of ways. For example, the data packet 210 can include an email message to be delivered to a recipient, a uniform resource locator (URL) requesting a hypertext markup language (HTML) page from the corresponding Internet site, data to be stored in a network area storage (NAS) device, spreadsheet data for tabulation, a portion thereof to be reassembled upon reaching the network device, etc. Optionally, the transaction 200 can also include additional fields. For example, the transaction 200 can include a destination field 230, such as a device on the network indicated or identified by an IP address.

The service tag 220 is preferably a single or multi-bit packet associated with the data packet 210, the value of which identifies a requested level of service for the transaction 200. However, the service tag 220 and the requested service level identified therein can take any suitable form. The service tag 220 can be a numeric value. For example, the service tag 220 may be a single bit such as a "one", indicating high priority, or a "zero", indicating low priority. Or for example, the service tag can be a number on a scale of one to ten, with each number indicating a level of service. Alternatively, the service tag 220 can indicate the requested level of service as a predefined service category. For example, the requested level of service can be indicated as premium, standard, or low. Likewise, the service tag 220 can indicate the requested level of service as a specific parameter. For example, the service tag 220 can indicate the processing speed or capacity required or desired for the transaction 200. Or for example, the service tag 220 can indicate a turn-around time for the transaction.

It is also understood that the service tag 220 can include multiple packets. Similarly, an individual service tag 220 may comprise more than one indicator. These multiple packets, or indicators within a packet, may be combined to indicate the requested level of service. Separate packets (or indicators) may be included, such as, a time-stamp, an origination ID, an application ID, a user ID, a project ID, etc. In such an embodiment, the requested service level can be a combination of some or all of the packets included therein. For example, a transaction 200 can be handled with high priority where the user ID is "administrator" and the origination ID is "network administration tools". Or for example, a transaction 200 may be handled with high priority where the user ID is "user 1" and the time-stamp indicates the transaction must be completed during business hours. Likewise, a transaction 200 also having a user ID of "user 1" may be handled with lower priority where the time-stamp indicates that the transaction can be completed during off-peak hours.

Alternatively, these multiple packets can individually indicate or identify the requested level of service. For example, the service tag 220 may indicate a preferred level of service and a backup level of service. In such an embodiment, where the preferred level of service is unavailable, the transaction is preferably handled or processed according to the backup level of service. In addition, in this embodiment the transaction 200 may be "bounced" (i.e., returned to the originating computer) where neither the preferred level of service nor the backup level of service can be provided. Or a warning or a message may be returned to the originator where either the backup level of service is provided or where neither is provided.

In yet another alternative, the transaction 200 can be prioritized based on a first packet (or indicator) or set of packets (or indicators), and the remaining packets (or indicators) are read or factored in only where there is a conflict between service levels requested by more than one transaction 200. For example, where the user ID packet is "administrator" for more than one transaction 200, the competing transactions 200 can be hierarchically prioritized based on the application ID packet, and so forth.

It is also understood that the requested level of service need not be a separate packet (i.e., service tag 220) associated with data packet 200. For example, the requested level of service can be included as part of the destination packet 230. Or for example, the requested level of service may be included with the data packet 210.

Preferably, the transaction 200 is assigned a service tag 220 at its source (i.e., where the transaction 200 originates). However, it is understood that the service tag 220 may be assigned and/or changed at any suitable device along the transaction path, as explained below with respect to FIG. 9.

It is understood that the requested level of service indicated by the service tag 220 may be assigned to the transaction 200 based on any number of factors. The requested level of service may be based on the time sensitivity of the transaction 200. For example, data that is time sensitive may be assigned a higher priority than data that is not time sensitive. Or for example, a transaction 200 that would normally be assigned to a slow server during business hours can be assigned to a faster server during evening hours and on weekends. The requested level of service may also be based on characteristics or parameters of the transaction 200 itself. For example, large processing requests can be assigned to faster servers. The requested level of service may also be based on the user identification. For example, users that generally require faster processing speeds (the CAD department or an administrator) may be assigned faster servers than those who require the servers only to back up data. Likewise, users (e.g., an administrator) can be designated as having the highest priority, overriding competing transactions.

In addition, the requested level of service may be manually assigned to a transaction 200. That is, the requested level of service may be user-defined. Suitable program code (e.g., a user interface) can be included at a network device (e.g., a workstation, router, etc.) or as part of an application (e.g., an operating system, the originating application, an applet, etc.). For example, the user may be queried before starting an application as to the requested level of service. The user might have predefined options (e.g., a menu, list, etc.). Or the user may specify a requested level of service (e.g., using predefined commands or command strings). Alternatively, the requested level of service may be set by an administrator. For example, the administrator may assign a priority to a particular workgroup, user, project, application, etc.

In another embodiment, the requested level of service may be automatically assigned to a transaction 200. That is, the requested level of service may be assigned by a network device (e.g., a workstation, router, etc.) or an application (e.g., an operating system, the originating application, an applet, etc.). Suitable program code can be included at the network device and/or the application to assign the requested level of service based on a fixed parameter (e.g., a user ID, application ID, passcode, etc.), a dynamic parameter (e.g., the time of day, current load, etc.) or a combination thereof.

In yet another embodiment, the requested level of service may be selected through a combination of manual and automatic identification. For example, the user may define a requested level of service, and the transaction may be automatically marked with an application ID, a time-stamp, etc. In such an embodiment, the transaction 200 may be handled based on the user-defined level of service, the automated markings, or a combination thereof.

It is understood that the above examples are merely illustrative of the requested level of service and associating it with the data packet 210 (e.g., assigned to the transaction 200). Other examples are also contemplated as within the scope of the present invention.

Figure 4:
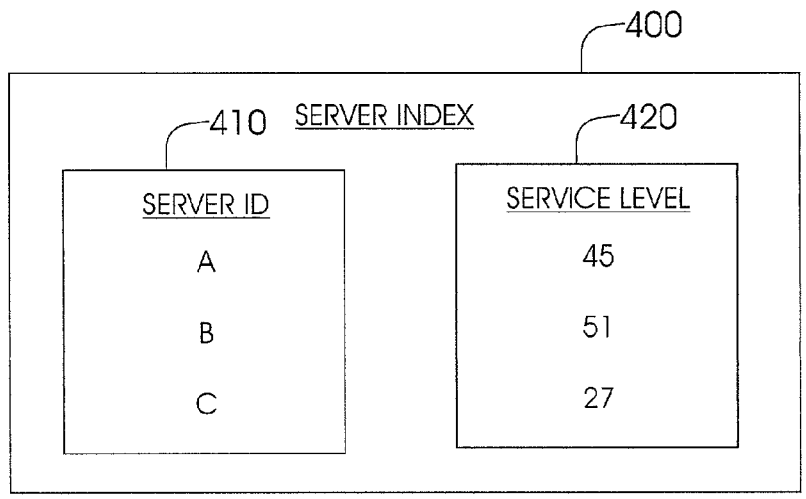
FIG. 4 illustrates a server index identifying servers and the corresponding service level of each server that can be used by the load balancer in FIG. 3.
Figure 3:
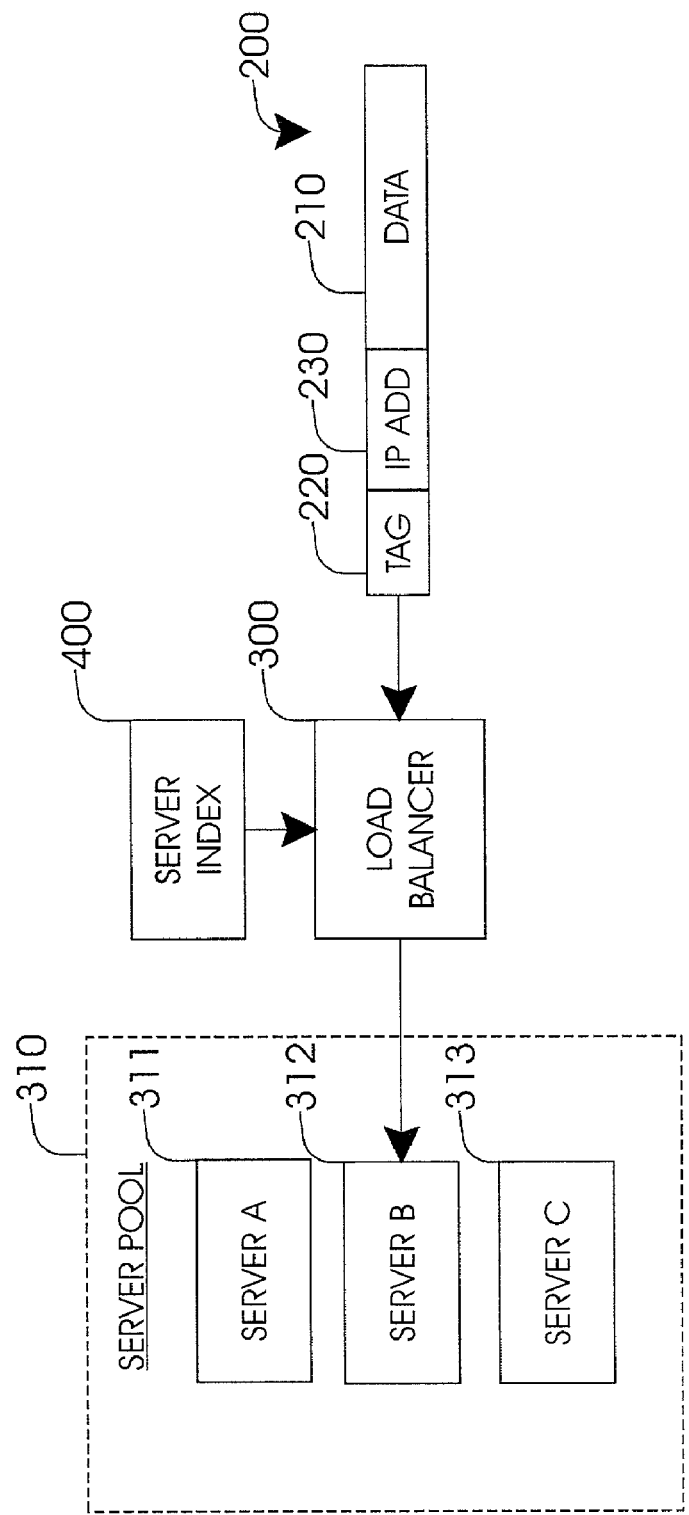
FIG. 3 shows a second embodiment of a load balancer for routing the transaction of FIG. 2 to a server based on the requested level of service indicated by the service tag.

FIG. 3 shows the transaction 200 received at a load balancer 300 and directed to a server 311, 312, 313 in a server pool 310 that is best able to process the transaction 200 based on the requested level of service indicated by the service tag 220. In FIG. 3, the load balancer 300 selected server 312 (Server B) as the server that is best able to process the transaction 200, using the service tag 220 and the server index 400 (FIG. 4).

The server index 400 (FIG. 4) is preferably a multi-dimensional array (e.g., a database or "lookup table") stored in a memory accessible by the load balancer 300. The server index 400 includes at least a server identification (ID) 410 and a corresponding service level 420 for each server 311, 312, 313 in the server pool 320 that is managed by the load balancer 300. The server ID 410 can be the server IP address, a path, or any other suitable means that the load balancer 300 can use to identify a server 311, 312, 313 and direct a transaction 200 thereto. Other data related to the various servers can also be included in the server index, such as that status of a particular server (e.g., availability, current load), alternative or backup servers or server pools, etc.

The service level 420 can be any suitable indicator, such as but not limited to a number on a scale of one to ten, a category of service, the time (e.g., weekday or weekend), a user identification (e.g., user1, user2, administrator), a transaction type (e.g., email, video), a combination thereof, etc. Furthermore, the service level can be based on information about the monitored servers obtained by polling the servers, predefined service specifications, etc. Likewise, the servers can be ranked relative to one another, relative to the types of transactions processed, etc.

When the transaction 200 is received by the load balancer 300, the service tag 220 is read using suitable program code. The load balancer 300 then accesses the server index 400 to determine (e.g., using suitable program code) the server in the server pool 310 that can best provide the requested level of service associated with the transaction 200 (i.e., as indicated by the service tag 220). For example, where the service tag 220 indicates a requested level of service having a scale value of "50", the server index 400 indicates that server 312 (Server B) is providing a corresponding service level 420 having a scaled value of "51", while the other servers 311 and 313 are providing lower levels of service. Hence, the load balancer 300 directs the transaction to server 311 (Server B), as shown in FIG. 3. As another example, where the service tag 220 indicates the requested level of service is a scaled value of "25", the load balancer 300 directs the transaction 200 to server 313 (Server C), which is providing a corresponding service level 420 having a scaled value of "27", as indicated by the server index 400.

It is to be understood that the term "best", as that term is used herein with respect to the server best able to provide the requested level of service, is defined to mean "best as determined by the program code of the load balancer", and may be interpreted by a load balancer as, for example, "nearest" or "meeting" the requested level of service. Thus, even where the requested level of service and the service level actually being provided are at opposite ends of a spectrum (e.g., the requested level of service is a scaled value of "50" but the service levels being provided by the servers range from scaled values of "5" to "10"), the server providing the service level nearest to that requested (e.g., a service level having a scaled value of "10") is considered to be "best" able to provide the requested level of service. However, it is also to be understood that where the disparity between the requested level of service and the service level being provided is unacceptable (i.e., based on a predetermined level of acceptability, such as more than "10" scale values difference), the load balancer 300 can direct the transaction to the server best able to provide the requested service level, but also return a warning signal (e.g., an email, an error message, etc.) to the requester (e.g., an administrator, the user, the originating application, etc.) notifying the requestor of the disparity. Alternatively, the load balancer 300 can redirect the transaction 200 to another load balancer that is monitoring another pool of servers, the load balancer 300 can "bounce" the transaction 200 altogether, etc.

It is also to be understood that the term "server" as used herein can be any computer or device that manages resources, such as a file server, a printer server, a network server, a database server, etc. In addition, the servers can be dedicated or the servers can be partitioned (i.e., have multiprocessing capability), in which case the term "server" may instead refer to software that is managing resources rather than to an entire computer or other hardware device.

Figure 5:
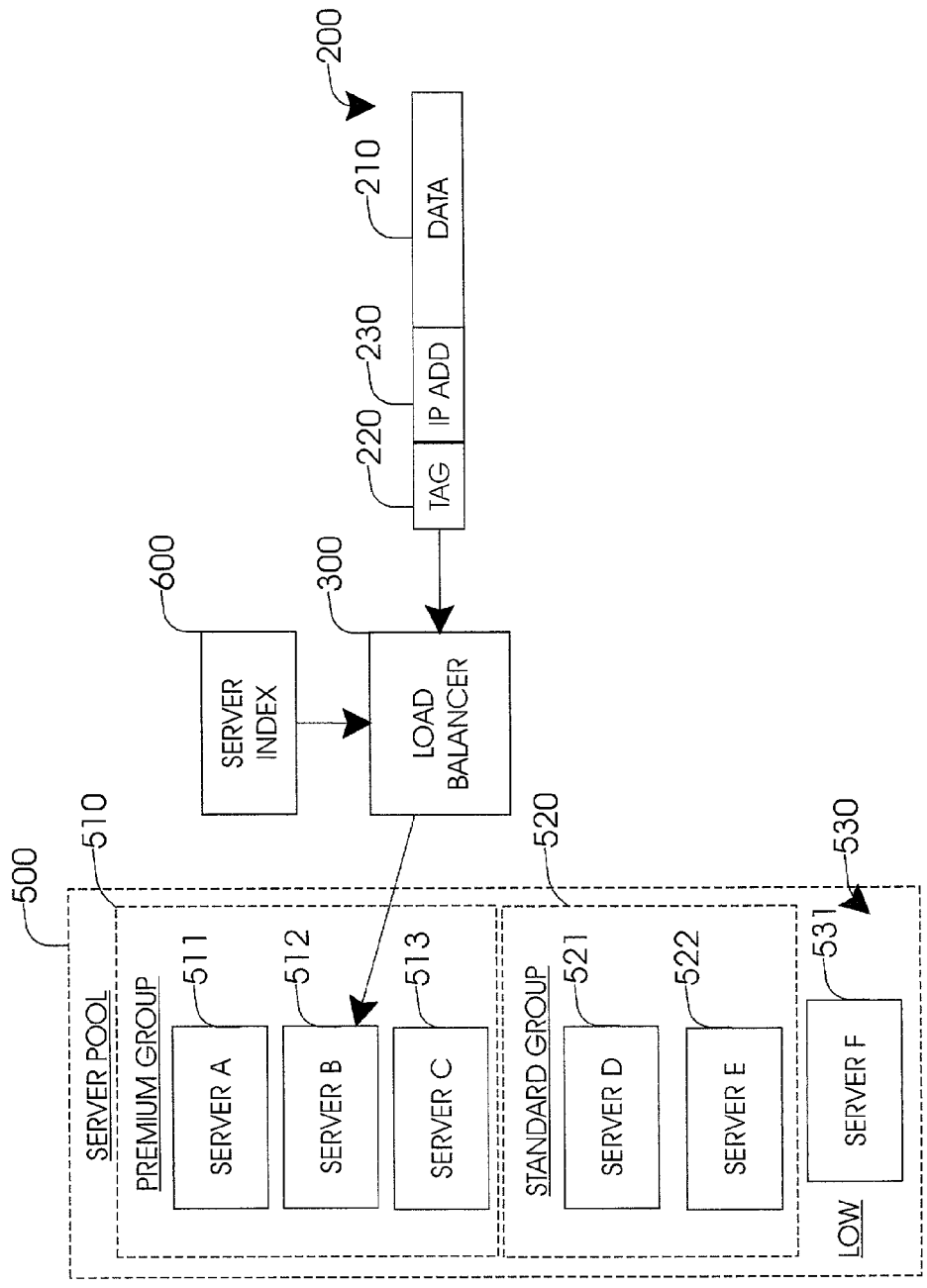
FIG. 5 shows a load balancer routing the transaction of FIG. 2 to a server within a group of servers each best able to provide the requested level of service indicated by the service tag.

In FIG. 5, the server pool 500 includes a premium group 510, a standard group 520, and a low priority group 530. The servers 511, 512, and 513 (A, B, and C, respectively) are part of the "premium" group 510. For example, the premium group 510 can include high-speed, high-capacity servers. In addition, the premium group 510 can include additional servers and backup servers so that there is always an available server in this group. Access to these servers can be reserved for a department with high demand requirements (e.g., the CAD department), for high priority transactions, for customers paying a fee to access these servers, etc. The standard group 520 can include average-speed, average capacity servers. Access to these servers 521, 522 (D and E) can be designated for a sales/marketing department that requires only average processing capacity, or can also be available on a fee-basis. The "low priority" group 530 can include older and/or less expensive servers 531 that do not perform at the predetermined standards of the standard group 520 or the premium group 510. These servers 531 can be used for low-priority email, backup jobs, transactions requested during off-peak hours when timeliness is not as important, etc. These servers can be designated as a group 530, or simply be unclassified servers in the server pool 500.

It is to be understood that any number of groups can be designated. The manner in which groups are designated can include static parameters such as processing speed, capacity, server proximity, etc. However, preferably the groups 510, 520, 530 are dynamically designated based on monitored performance of the individual servers. For example, where a "premium" server (e.g., 511) is not performing to a predetermined standard, it can be reclassified as a standard or low priority server (i.e., in group 530), whereas a standard server (e.g., 521) that has recently been upgraded can be reclassified as a premium server (i.e., in group 510). Likewise, the invention disclosed herein is not to be limited by the groups 510, 520, 530 shown in FIG. 5. For example, more or fewer groups can be used, servers can be further subdivided within the groups, the groups can be identified by means other than the labels "premium", "standard", and "low", etc.

The service level being provided by each server can be based on, as illustrative but not limited to, the server meeting the service level objectives of a single user, a user group (e.g., the accounting department), or a transaction type (e.g., email). That is, preferably the load balancer 300 (or suitable software/hardware agent) monitors the service level provided by each server in the server pool to generate the server index. For example, the load balancer 300 can measure or track processing parameters of a server (e.g., total processing time, processor speed for various transactions, etc.) with respect to a single user, a user group, a transaction type, etc. Alternatively, the server index can be based on known capabilities (e.g., processor speed, memory capacity, etc.) and/or predicted service levels of the servers in the server pool (e.g., based on past performance, server specifications, etc.). Or for example, the load balancer 300 can access multiple server indexes, wherein each index is based on a different set of monitored server parameters. A group ID or the like associated with a transaction can then be used as the basis for the load balancer 300 accessing a particular server index.

In any event, it is understood that the service level provided by each server in the server pool can be formatted similar to the requested level of service. Alternatively, program code for translation can be implemented (e.g., at the load balancer 300) to convert between formats. For example, a category of service level, such as "premium", associated with the transaction 200 can be converted to a scale value, such as "50", associated with a server or group of servers in the server pool.

Figure 6:
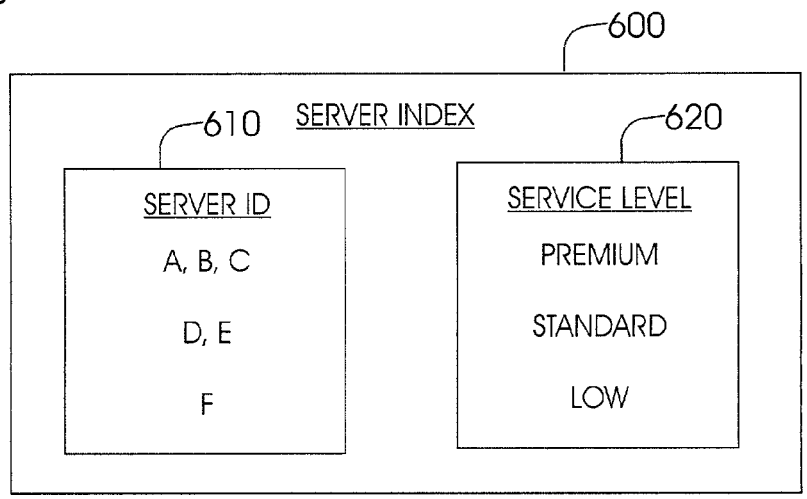
FIG. 6 illustrates a server index identifying groups of servers and the corresponding service level of each group that can be used by the load balancer in FIG. 5.

When the transaction 200 is received at the load balancer 300, the load balancer 300 reads the requested level of service from the service tag 220. Based on the server index 600 (FIG. 6), the load balancer 300 selects the server (e.g., 512) from the server group (e.g., 510) that is best providing the requested level of service (e.g., "premium"). That is, the server index 600 contains the server ID 610 and a corresponding level of service 620, similar to the server index 400 in FIG. 4. However, in server index 600, the server ID 610 is indicated as a group of servers. That is, Servers A, B, and C, are providing a "premium" level of service, Servers D and E are providing a "standard" level of service, and Server F is providing a low-priority level of service. Thus for example, where the service tag 220 indicates that the requested level of service is "premium", the load balancer 300 directs the transaction 200 to any one of the servers 511, 512, 513 in the premium group 510. The load balancer can use conventional load balancing algorithms (e.g., next available, fastest available, or any other suitable algorithm) to select a specific server 511, 512, 513 within the premium group 510.

It is understood that the load balancing schemes shown in FIG. 3 and FIG. 5 are illustrative of the apparatus and method of the present invention and are not intended to limit the scope of the invention. Other configurations are also contemplated as being within the scope of the invention. For example, multiple load balancers can be networked to administer a single server pool or multiple server pools. Such a configuration allows a load balancer experiencing heavy use to transfer some or all of the transactions in bulk to another load balancer experiencing a lighter load. Or for example, a hierarchy of load balancers might administer the server pool. A possible hierarchical configuration could comprise a gate-keeping load balancer that directs transactions either to a load balancer monitoring a premium server pool or to a load balancer monitoring a standard server pool, and the individual load balancers can then select a server from within the respective server pool.

FIG. 7 shows a method for routing the transaction 200 to a server based on a requested level of service associated with the transaction 200 generated in step 710, using suitable program code and stored on a number of (i.e., one or more) suitable computer readable storage media. In step 700, the load balancer 300 (or a suitable software/hardware agent) monitors the server pool 320, 500 to determine the service level of each server in the server pool. In step 710, the load balancer 300 (or a suitable software agent) uses the monitored data to generate a server index (e.g., 400, 600) having at least the server ID (e.g., 410, 610) and the corresponding service level (e.g., 420, 620), including groups of servers where desired. In step 720, when a transaction 200 is received at the load balancer 300, the load balancer 300 (or suitable program code associated therewith) reads the requested level of service indicated by the service tag 220 associated with the transaction 200. In step 730, the load balancer 300 accesses the server index to select a server from the server pool that is best able to provide the requested level of service. Once a server has been selected, the load balancer 300 directs the transaction 200 to the selected server in the server pool in step 740.

It is understood that the method shown and described with respect to FIG. 7 is merely illustrative of a preferred embodiment. However, each step need not be performed under the teachings of the present invention. Step 710 can be modified or eliminated, as an example, where a server index is provided with a predetermined server ID and the corresponding service level is packaged with the load balancer 300. Likewise, the steps need not be performed in the order shown in FIG. 7. For example, the transaction 200 can be received and the service tag 220 read by the load balancer (as in step 720), followed by the load balancer 300 monitoring the server pool for a server providing the requested level of service (as in step 700). In such an example, it is also understood that a server index need not be generated at all (as in step 710) and that the load balancer can select a server dynamically (i.e., based on current server performance).

Figure 8:
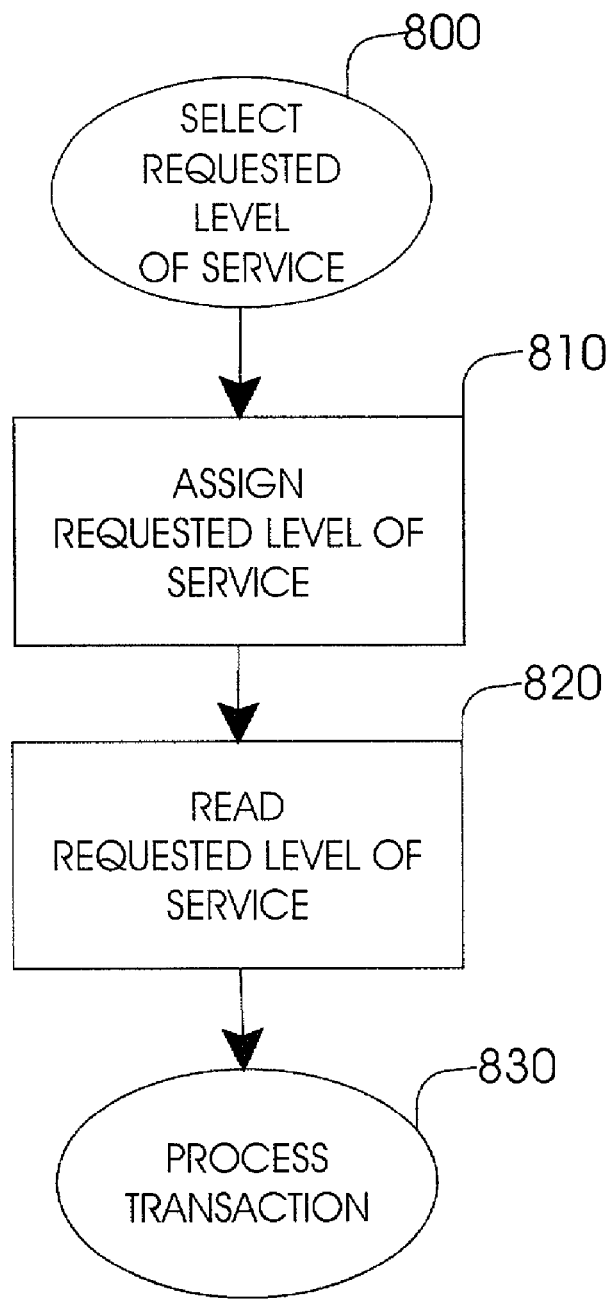
FIG. 8 is a flow chart showing a method for identifying a requested level of service for a transaction for processing in accordance with the requested level of service.

FIG. 8 shows a method for identifying a requested level of service for a transaction, wherein the transaction may be processed in accordance with the requested level of service. In step 800, the requested level of service is selected for the transaction 200. The requested level of service can be selected by the original application, an administrator, etc., as explained above. Likewise, the requested level of service can be based on any suitable factors and assigned by any suitable device on the network. In step 810, the requested level of service is assigned to the transaction 200 (e.g., as a service tag 220 associated with the data packet 210). In step 820, the service tag 220 is read (e.g., by a load balancer 300 in FIG. 3 and FIG. 5) using suitable program code. In step 830, the transaction 200 is directed to and processed by a network device, such as a server in server pool 310, 500 (FIG. 3 and FIG. 5, respectively) based on the service tag 220, as discussed above.

Figure 9:
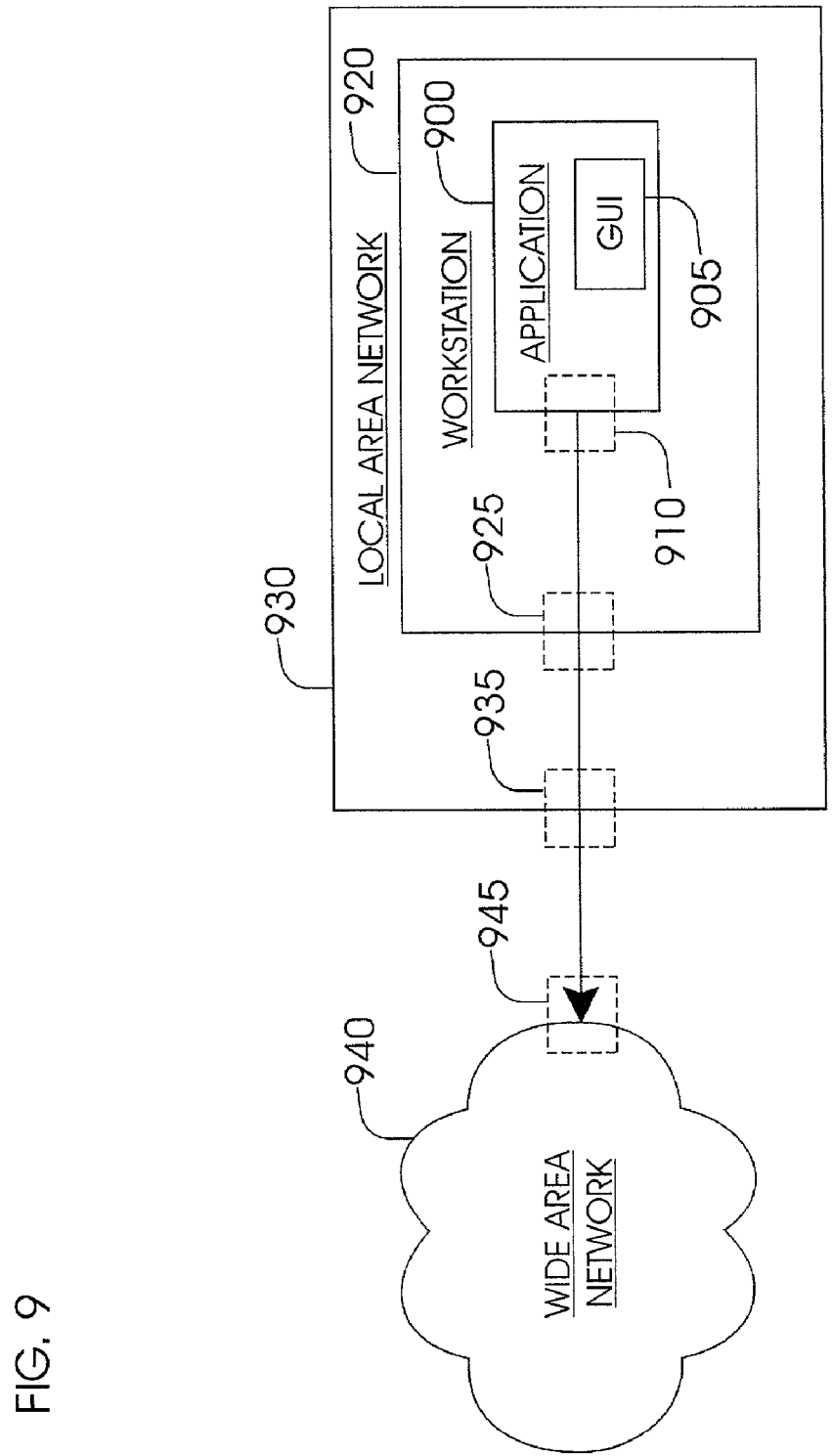
FIG. 9 illustrates various points of a system where the service tag may be assigned to the transaction.

FIG. 9 illustrates various points of a system where the service tag 220 may be assigned to the transaction 200. For example, the service tag 220 may be assigned to the transaction 200 at the originating application 900 via a graphical user interface (GUI) 905 or via other suitable program code 910 integrated as part of the application or interacting therewith. Or for example, the service tag 220 may be assigned at a workstation 920 via the operating system (OS) 925 or other suitable program code executed on the workstation 920. In another example, the service tag 220 may be assigned on the local area network 930 by a network component 935 (e.g., a server, another workstation, a router, hub, etc.), and/or on the wide area network 940, also by a network component 945.

It is understood that the service tag 220 may be assigned to the transaction 200 at any number of points, and FIG. 9 is merely intended to be an illustration thereof. Other examples include assigning the service tag 220 to the transaction 200 by an intermediary computer, a gateway, a load balancer, etc. Another example may include dynamically assigning the service tag 220. That is, the service tag 220 may be assigned to the transaction 200 at the originating application 910, then appended at the operating system 925, and further changed at a router 935 and/or 945 on the network 930 and/or 940 before the transaction 200 reaches the destination. More specifically, the user may request a level of service of "high priority" for a transaction 200 via GUI 905. The operating system 925 may subsequently append a backup level of service of "medium priority" to the transaction 200. A router 935 and/or 945 that receives the transaction 200 while handling a heavy load from a high priority user (e.g., an administrator), may then change the requested level of service to "best available". As such, the service tag 220 need not be statically assigned.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for identifying a requested level of service for a transaction, comprising:
   non-transitory computer readable storage media; and
   computer readable program code stored in said storage media, comprising:
   a) program code for prompting a user to select a requested level of service for said transaction;
   b) program code for assigning said requested level of service to said transaction;
   c) program code for selecting a backup level of service; and
   d) program code for assigning said backup level of service to said transaction when said requested level of service is unavailable, wherein said transaction is directed to a network device that is best able to provide said requested level of service for processing said transaction, wherein said best able to provide is determined by program code of a load balancer as to what is a nearest level of service to said requested level of service.

2. An apparatus, as in claim 1, wherein said transaction is a packetized signal comprising at least a data packet, and wherein a service tag is associated with said data packet by said program code for assigning said requested level of service, said service tag including said requested level of service.

3. An apparatus, as in claim 1, wherein said requested level of service is a predefined service category.

4. A method for requesting a level of service for a transaction on a network, comprising:
   selecting said requested level of service for said transaction via a user interface; and
   assigning said requested level of service to said transaction;
   selecting a backup level of service; and
   assigning said backup level of service to said transaction when said requested level of service is unavailable, wherein said transaction is directed to a network device that is best able to provide said requested level of service for processing said transaction, wherein said best able to provide is determined by program code of a load balancer as to what is a nearest level of service to said requested level of service.

5. An apparatus for routing a transaction over a network based on a requested level of service associated with said transaction, comprising:
a number of non-transitory computer readable storage media; and
computer readable program code stored in said number of storage media, comprising:
a) program code for selecting said requested level of service for said transaction;
b) program code for assigning a service tag to said transaction, said service tag including said requested level of service, and said program code assigning parts of said service tag at more than one point on said network;
c) program code for reading said requested level of service from said service tag;
d) program code for directing said transaction over said network based on said requested level of service read from said service tag;
e) program code for selecting a backup level of service; and
f) program code for assigning said backup level of service to said transaction;
wherein said transaction is directed to a network device that is best able to provide said requested level of service for processing said transaction, wherein said best able to provide is determined by program code of a load balance as to what is a nearest level of service to said requested level of service.

6. An apparatus, as in claim 5, wherein said transaction is directed over said network to a device best providing said requested level of service.

7. An apparatus, as in claim 5, wherein said service tag is read by program code at more than one point on said network.

8. An apparatus, as in claim 5, further comprising program code for changing said requested level of service included on said service tag.

* * * * *